United States Patent [19]

Cronin et al.

[11] Patent Number: 5,766,565
[45] Date of Patent: Jun. 16, 1998

[54] PURIFICATION OF HYDROCHLORIC ACID

[75] Inventors: Kirk Andrew Cronin, Freeland, Mich.; Robert Dennis Crow, Louisville, Ky.; William Andrew Evanko, Golden, Colo.

[73] Assignee: Dow Corning Corporation, Midland, Mich.

[21] Appl. No.: 6,411

[22] Filed: Jan. 21, 1993

[51] Int. Cl.[6] ................................. C01B 07/07
[52] U.S. Cl. ........................ 423/488; 210/670
[58] Field of Search ..................... 423/481, 488; 210/670, 673, 674

[56] References Cited

U.S. PATENT DOCUMENTS

| | | | |
|---|---|---|---|
| 1,822,372 | 8/1931 | Putnam | 423/488 |
| 3,720,626 | 3/1973 | Benzaria et al. | 210/674 |
| 4,187,195 | 2/1980 | Kennedy | 210/673 |
| 4,558,022 | 12/1985 | Farmerie | 210/670 |
| 5,202,106 | 4/1993 | Vanlautem | 423/488 |

FOREIGN PATENT DOCUMENTS

| | | | |
|---|---|---|---|
| 2413043 | 9/1975 | Germany | 423/488 |
| 3-28102 | 2/1991 | Japan | 423/488 |
| 1183454 | 10/1985 | U.S.S.R. | 423/488 |

OTHER PUBLICATIONS

Encyclopedia of Chemical Technology, Third Edition, vol. 4, p. 561: by: Kirk-Othmer, 1980 (no month).

*Primary Examiner*—Ngoc-Yen Nguyen
*Attorney, Agent, or Firm*—Rick D. Streu

[57] ABSTRACT

A process is described by which numerous waste or by-product aqueous hydrochloric acid streams can be purified by contacting the aqueous hydrochloric acid with activated carbon to remove silicon containing impurities and thereby allowing the hydrochloric acid to be re-used for various applications.

8 Claims, No Drawings

PURIFICATION OF HYDROCHLORIC ACID

BACKGROUND OF THE INVENTION

A wide variety of commercial silicone polymers are produced by the hydrolysis of a few basic chlorosilanes. These important chlorosilane monomers are produced by processes that also yield aqueous hydrochloric acid as a major by-product. For example, the hydrolysis of dimethyldichlorosilane yields 2 moles of hydrogen chloride for every mole of chlorosilane hydrolyzed. Because of the commercial importance of these and other processes for producing chlorosilanes, large amounts of by-product aqueous hydrochloric acid streams are generated.

Aqueous hydrochloric acid resulting as a by-product from the hydrolysis of chlorosilanes, as well as from other sources, is often contaminated with silicon containing materials, primarily silanols and siloxanes. Additionally other contaminants may be present such as solvents, hydrocarbons, and chlorinated hydrocarbons. Removal of these materials has proven a problem, particularly when relatively small concentrations of these materials are objectionable.

The bulk of these materials may phase separate as an oil layer on the aqueous hydrochloric acid and thus can be separated utilizing various techniques, but there remains small concentrations, typically below about 1000 milligrams per liter (mg/l), of these materials which are still soluble or stable in the aqueous hydrochloric acid. Some of this by-product hydrochloric acid can be re-used for various commercial applications if it is cleaned up.

However, much of the aqueous hydrochloric acid ends up as waste streams that must be neutralized and disposed of because the level of undesirable contaminants prevents its use for many applications. This represents not only an economic loss of a valuable source of chloride ion for commercial production of chlorosilane intermediates but also poses a potential negative impact on the environment, by impacting the level of total dissolved solids present in commercial wastewater streams.

To the applicants knowledge, there does not seem to be any patents or other publications directed to the separation of soluble or stable silanols and siloxanes from aqueous hydrochloric acid. However, Putnam, in U.S. Pat. No. 1,822, 372, issued Sep. 8, 1931, discloses the use of activated charcoal to remove volatile hydrocarbon compounds from aqueous acids resulting as a by-product in the halogenation of benzene compounds with a fair degree of success. These chlorinated hydrocarbons are not reactive materials in the sense that the silanols and siloxanes of the instant invention are. Such silanols and siloxanes are reactive and can undergo condensation polymerization when in contact with hydrochloric acid.

One object of this present invention is to provide a process by which aqueous hydrochloric acid can be more easily purified. Another object is to provide a process by which small concentrations of silicon containing impurities can be more easily removed from aqueous hydrochloric acid such that the hydrochloric acid is made suitable for re-use. Still another object of this invention is to economically refurbish aqueous hydrochloric acid streams to greatly reduce the chloride ion that must be neutralized and disposed of. These and other objects of this invention will become apparent to one of ordinary skill in the art after reading this specification.

BRIEF SUMMARY OF THE INVENTION

This invention relates to a process for removing undesirable silicon containing materials from aqueous hydrochloric acid thereby allowing the hydrochloric acid to be re-used for various commercial processes, said process comprising the steps of (I) contacting said hydrochloric acid with activated carbon, in the liquid phase, for a time sufficient to allow any silicon-containing materials contained in said hydrochloric acid to adsorb on the activated carbon thereby treating said hydrochloric acid, and (II) separating the treated hydrochloric acid from the activated carbon. This makes the treated hydrochloric acid suitable to be re-used in commercial processes, which significantly reduces the quantity of hydrochloric acid that ends up as waste streams from commercial processes.

DETAILED DESCRIPTION OF THE INVENTION

The process described and claimed herein is a process for treating aqueous hydrochloric acid to remove silicon-containing materials. The process comprises contacting contaminated aqueous hydrochloric acid with activated carbon for a time sufficient to allow any silicon-containing materials in the aqueous hydrochloric acid to adsorb on the activated carbon; followed by separating the treated aqueous hydrochloric acid from the activated carbon.

The apparatus and the method steps of this process are not narrowly critical as long as the essential step of contacting the aqueous hydrochloric acid with activated carbon is achieved. The activated carbon may be mixed with the aqueous acid in a suitable vessel to achieve contact and subsequently separated from the treated hydrochloric acid, for example by filtration. However, it is preferred that the aqueous acid be passed through a suitable packed bed of activated carbon to facilitate handling of commercial aqueous hydrochloric acid streams. This may be done in a batch, semi-continuous or continuous mode to achieve the desired reduction in silicon containing materials. The use of multiple beds of activated carbon may also be used according to the method of this invention. In order to gain the advantages of this process the hydrochloric acid must be in the liquid state during the contact with the activated carbon.

Temperatures in the range of 0° to 65° C. are suitable if sufficient contact time between the activated carbon and the aqueous acid are maintained and the acid remains in the liquid phase.

For purposes of this invention, the activated carbon useful herein is not narrowly critical, at least in the range of commercially available materials. According to the *Encyclopedia of Chemical Technology* by Kirk-Othmer, Third Edition, Vol. 4, Pg. 561, commercial grades of activated carbon are designated as either gas-phase or liquid-phase adsorbents. Liquid-phase carbons are generally powdered or granular in form; gas-phase, vapor-adsorbent carbons are hard granules or hard, relatively dust-free pellets.

Both types of activated carbons are useful for the purposes of this invention. However, the liquid-phase carbon may offer advantages if a packed bed of the adsorbent is used since it provides a more desirable porosity and particle size which reduces the potential for an excessive pressure drop across the packed bed. An acid washed carbon such as Calgon CPG 12×40 granular carbon (Calgon Carbon Corp., Pittsburgh, Pa.) is a preferred type of carbon since the carbon is acid washed to prevent leaching of components from the adsorbent into the acidic solution to be treated.

The term refurbishment is understood to mean suitable for re-use. For example to say that the aqueous hydrochloric acid is refurbished by the process of this invention, means that the impurities in the aqueous hydrochloric acid have been reduced to such a level as to make the aqueous hydrochloric acid usable in the same or similar process applications in that the purity of the aqueous hydrochloric acid is essentially equivalent to what it was prior to being used in the process application. To say that the activated carbon is refurbished means that the level of silicon containing impurities have been removed from the surface of the carbon to such an extent that the carbon is useful again for treating aqueous hydrochloric acid.

Silicon materials or impurities are defined for the purpose of this invention to be any silane, silanol or siloxane which is soluble or stable for an extended period of time in aqueous hydrochloric acid. For example, in a typical hydrolysis process stream, the bulk of the siloxanes phase separate almost immediately from the aqueous acid layer. Some of the silanes and siloxanes formed are present as a colloidal suspension that can be physically removed from the bulk aqueous phase. However, small portions of these materials ranging below about 1000 mg/l are stable in the aqueous phase indefinitely or for at least a period of time ranging from several hours to several days. It is this last range of materials that is the topic of concern for the present invention. As one skilled in the art would understand, both the level of soluble silicon containing material and its affinity for aqueous HCl are very dependent on the functionality and molecular size of the silicon material. Both monomers and short chained siloxanes of a molecular weight tip to about 500 may be soluble or stable in aqueous HCl. The concentration of the HCl also has a bearing on the solubility of various silicon containing materials. The present invention is therefore not limited to a specific silicon-containing functionality, it has been found that aqueous HCl streams from a wide variety of silane and siloxane processes are suitable for purification by the process of the present invention. For example, streams containing methyl, phenyl, vinyl, organofunctional, hydrogen, hydroxide and chlorine, as well as other functionalities of commercial importance, on silicon are suitable for the process of the present invention.

For purposes of this invention, "contaminated" aqueous hydrochloric acid is hydrochloric acid from any source contaminated with silanols, siloxanes, solvents, hydrocarbons or chlorinated hydrocarbons. Of special importance is aqueous hydrochloric acid from the hydrolysis processes of various chlorosilanes, such processes including but not limited to the hydrolysis of methyl, vinyl, phenyl, hydrogen, organofunctional, chlorinated hydrocarbon, and fluorinated hydrocarbon containing chlorosilanes. The process of this invention is not limited by the HCl concentration of the aqueous hydrochloric acid; aqueous streams of hydrochloric acid (HCl) in the range of 1 to 36 percent by weight as hydrogen chloride are suited for refurbishment by the method of this invention. Average contact time between the activated carbon and the aqueous hydrochloric acid in the range of 5 to 60 minutes results in effluent HCl containing a "significantly reduced amount" of silicon materials, measured as atomic Si. The meaning of "significantly reduced amount" is dependent on the silicon content of the HCl feed. When the HCl feed contains more than about 500 mg/l as silicon, a "significantly reduced amount" is understood to mean that at least 75% of the silicon-containing impurities are removed from the HCl feed. When the HCl feed contains below 500 mg/l as silicon a "significantly reduced amount" is understood to mean that at least 90% of the silicon-containing impurities are removed from the HCl feed. In most cases more than 90% of the silicon-containing impurities are removed from the HCl feed by passage of the liquid through suitable activated carbon adsorption columns. The effluent streams of purified HCl usually contain less than 100 mg/l as silicon and in many cases less than 25 mg/l as silicon. In a preferred embodiment of the present invention having a minimum contact time of 30 minutes, all examples evaluated resulted in less than 20 mg/l as silicon in the effluent HCl.

The capacity of most of the activated carbons examined in the process of this invention was in the range of 400 to 900 kg HCl/kg activated carbon. As the capacity of the activated carbon is approached the silicon content in the effluent increases. When the silicon content of the effluent reaches about 150 mg/l as silicon, the column is said to have reached the silicon "breakthrough" level and is considered to be nearly exhausted. If more HCl is passed through the column after "breakthrough" has been reached the silicon content of the effluent will rapidly rise to high levels which will approach the level of silicon in the feed HCl. Naturally, this definition of "breakthrough" does not apply if one is attempting to purify an HCl stream containing less than 150 ppm silicon.

As noted above, a point is reached when the capacity of activated carbon towards silicon containing materials is reached. Thus, the process of this invention further relates to a process where the activated carbon of (II) is further treated to refurbish it, the refurbishment comprising (i) treating the activated carbon containing silicon-containing materials with water until the water has a pH in the range of 3 to 7; (ii) treating the activated carbon from (i) with a mixture of a base and solvent for a period of time in the range of 15 to 60 minutes; (iii) separating the activated carbon from the mixture of (ii); and (iv) treating activated carbon from (iii) with water until the water has a pH in the range of 7 to 8.

In a preferred embodiment of the present invention the refurbishment of the activated carbon could comprise the additional step of heating the carbon after the separation step (iii) to further remove solvent residue from the carbon, the refurbishment comprising (i) treating the activated carbon containing silicon-containing materials with water until the water has a pH in the range of 3 to 7; (ii) treating the activated carbon from (i) with a mixture of a base and solvent for a period of time in the range of 15 to 60 minutes; (iii) separating the activated carbon from the mixture of (ii); (iv) heating the activated carbon from (iii) for a period of time in the range of 0.5 to 4 hours at a temperature in the range of 70° to 150° C.; to remove the solvent residue; (v) cooling the activated carbon from (iv) to below about 50° C.; and (vi) treating activated carbon from (v) with water until the water has a pH in the range of 7 to 8.

The bases suitable for the present invention are selected from the group consisting essentially of sodium hydroxide and potassium hydroxide in the range of 1 to 20% by weight. Bases in the range of 5 to 15% by weight are particularly well suited for use in the present invention.

The solvents suitable for use in the present invention are selected from the group consisting essentially of methanol, ethanol, isopropyl alcohol, water and mixtures thereof. The mixtures of alcohols with water described hereinabove are understood to be in any proportions for the purposes of this invention. For example, in the mixture case of methanol and water the suitable range of said mixture covers from 100% methanol to 100% water and all proportions in between.

The apparatus used for refurbishment of the activated carbon is not critical, it could be done in a batch, semi-continuous, or continuous mode. For example the carbon could be refurbished in any suitable vessel which allowed contact of the carbon with the base/water or base/alcohol. In a preferred embodiment of the present invention, the activated carbon could be refurbished in the same packed column used for treating the HCl. A series of columns which could be operated in series or parallel to allow treatment of aqueous HCl or refurbishment of the activated carbon is within the scope of the present invention.

The following examples are to illustrate the invention and are not to be regarded as limiting.

Analysis for silicon content in the following examples was by three methods; direct current plasma spectrometry, x-ray fluorescence and atomic adsorption spectrometry. Silicon was measured at the atomic level as milligrams per liter (mg/l) unless otherwise specified.

EXAMPLE 1

This example demonstrates the superiority of activated carbon for removing impurities from aqueous hydrochloric acid. For comparison purposes, two other commercial adsorbents were also evaluated; CS331-4- 1/16 inch alumina extrudates (United Catalyst Inc., Louisville, KY.) and Amberlyst(R) A27 ion exchange resin (Rohm and Haas, Philadelphia, Pa.). The alumina and amberlyst are not within the scope of this invention. 14.5 grams of each adsorbent was packed into a 1.3 centimeter diameter by 25.4 centimeter long glass column and mounted vertically to be used to remove the impurities. Each column was equipped with a gravity feed reservoir attached to its top. Glass wool was used as a means to hold the carbon in the column and serve as a means to separate the carbon from the effluent acid stream. The columns were wetted with about 100 ml of water prior to feeding acid to the columns. After wetting the columns with water, each reservoir was filled with the same lot of siloxane contaminated hydrochloric acid (18% by weight as HCl) which was allowed to gravity feed down through the column. Residence time of the acid in contact with adsorbent was about 30 minutes. Inlet and effluent samples were taken and analyzed for silicon content by direct current plasma spectrometry.

Table 1 shows the concentration of atomic silicon measured in mg/l for the activated carbon and two comparative adsorbents. The silicon concentration for the starting aqueous hydrochloric acid source and the silicon concentration after passing the acid through each bed is also shown in Table 1.

The data reported in Table 1 demonstrate that the effluent concentration of atomic silicon in the treated aqueous hydrochloric acid was reduced to 14 mg/l using activated carbon compared to the other adsorbents. The concentrations reported were based on an average of three runs.

TABLE 1

| Comparison of Adsorbents Silicon content (mg/l) | | | |
|---|---|---|---|
| | Activated Carbon | Alumina | Amberlyst |
| Starting HCl | 453 | 453 | 453 |
| Effluent HCl | 14 | 477 | 365 |

EXAMPLE 2

This example demonstrates the capability to regenerate the activated carbon once silicon "breakthrough" had occurred and the carbon bed had reached its capacity for silicon containing materials. Five CPVC (copolyvinylchloride) columns were connected together in series so that the acid feed stream would contact the adsorbent sequentially in each column before leaving the system. Each column was 5 cm in diameter by 90 cm long. Each column was packed to a height of approximately 60 centimeters with 600 grams of Calgon CPG 12×40 granular carbon (Calgon Carbon Corp., Pittsburgh, Pa.). Once the adsorbent was loaded, the columns were filled with deionized water and pressure tested to a gauge pressure of 482.6 kPa (70 psi). The column unit was then connected to a waste aqueous hydrochloric acid stream (18% by weight as HCl) with a gauge pressure of 275.8 kPa (40 psi) from a methylchlorosilane hydrolysis process. Sample points were located at the effluent of each column before the acid stream was fed into the subsequent column. The residence time that the aqueous acid was in contact with the carbon was 30 minutes.

Contaminated aqueous hydrochloric acid was fed through the system until the atomic silicon level of the effluent from the first column showed the same level of silicon impurities as in the feed stream, an average of 531 mg/l. For purposes of this invention this point at which the effluent stream from the first column showed the same level of silicon impurities as in the feed stream was called "spent". The effluent from the combined columns remained at an average of 4 mg/l throughout the run. 1080 kilograms of acid were treated before the first column became "spent".

The activated carbon from the first column was used to evaluate various refurbishment techniques. Water, methanol, heptane, 10% by weight of sodium hydroxide in water, and 10% by weight of sodium hydroxide in methanol were tested for their ability to remove silanols and siloxanes from the activated carbon. The use of water and heptane are for comparative purposes and are not within the scope of this invention. 1000 grams of each of the aforementioned solutions and 100 grams of spent activated carbon were loaded into a Pyrex® reaction flask. The mixture was heated to its boiling point and refluxed for four hours and then cooled to below 50° centigrade. After cooling, the adsorbent was filtered from the solvent. The adsorbent was washed with deionized water until the water had a pH in the range of 7 to 8, then dried in an oven at 120° centigrade for 16 hours. The refurbished adsorbent was analyzed for silicon content by X-Ray Florescence.

Table 2 shows the results of the various refurbishment techniques. The spent carbon represents the carbon sampled from column 1 after the effluent silicon concentration reached the same value as the inlet silicon concentration. The value of 100% means that all the silanols and siloxanes adsorbed during the processing were still present on the carbon. The value of 0% for the new carbon represents the activated carbon as received from the manufacturer, containing no silanols or siloxanes. The range between 0 and 100 was an indicator of the effectiveness of the particular refurbishment technique used. The more effective the refurbishment technique, the lower the value of the percent silicon remaining on the carbon, thus indicating that more of the silicon materials were removed.

The data reported in Table 2 demonstrates the effectiveness of removing the silicon from the spent carbon using 10% by weight of sodium hydroxide (NaOH) in methanol or water compared to water, methanol, or heptane alone. In the case of the NaOH/methanol solution only 9% of the silicon remained after refurbishment and in the case of the NaOH/water solution, 44% of the silicon remained after refurbishment.

TABLE 2

Comparison of Refurbishment Techniques

| Technique | % Silicon Present on the Carbon |
|---|---|
| Spent Carbon | 100 |
| Water | 95 |
| Heptane | 74 |
| Methanol | 62 |
| 10% NaOH in Water | 44 |
| 10% NaOH in Methanol | 9 |
| New Carbon | 0 |

What is claimed is:

1. A process for treating contaminated aqueous hydrochloric acid to remove silicon-containing materials, the process comprising (I) contacting said hydrochloric acid with activated carbon for a time sufficient to allow any silicon-containing materials contained in said hydrochloric acid to adsorb on the activated carbon thereby treating said hydrochloric acid and the activated carbon having adsorbed silicon-containing materials thereon; and (II) separating the treated aqueous hydrochloric acid from the activated carbon.

2. A process as claimed in claim 1 wherein the aqueous hydrochloric acid concentration is between 1 to 36% by weight as hydrogen chloride.

3. A process as claimed in claim 1 wherein the activated carbon of (II) is further treated to refurbish it, the refurbishment comprising (i) treating the activated carbon containing silicon-containing materials with water until the water has a pH in the range of 3 to 7;

(ii) treating the activated carbon from (i) with a mixture of base and solvent for a period of time in the range of 15 minutes to 60 minutes;

(iii) separating the activated carbon from the mixture of (ii);

(iv) treating said activated carbon from (iii) with water until the water has a pH in the range of 7 to 8.

4. A process claimed as in claim 3 wherein the base is selected from the group consisting of sodium hydroxide and potassium hydroxide.

5. A process claimed as in claim 3 wherein the solvent is selected from the group consisting of methanol, ethanol, isopropyl alcohol, water, and mixtures thereof.

6. A process as claimed in claim 1 wherein the activated carbon of (II) is further treated to refurbish it, the refurbishment comprising (i) treating the activated carbon containing silicon-containing materials with water until the water has a pH in the range of 3 to 7;

(ii) treating the activated carbon from (i) with a mixture of base and solvent for a period of time in the range of 15 minutes to 60 minutes;

(iii) separating the activated carbon from the mixture of (ii);

(iv) heating the activated carbon from (iii) for a period of time in the range of 0.5 to 4 hours at a temperature in the range of 70° to 150° centigrade;

(v) cooling the activated carbon from (iv) to below about 50° centigrade; and (vi) treating said activated carbon from (v) with water until the water has a pH in the range of 7 to 8.

7. A process claimed as in claim 6 wherein the base is selected from the group consisting of sodium hydroxide and potassium hydroxide.

8. A process claimed as in claim 6 wherein the solvent is selected from the group consisting of methanol, ethanol, isopropyl alcohol, water, and mixtures thereof.

* * * * *